(12) United States Patent
Watanabe et al.

(10) Patent No.: US 8,187,110 B2
(45) Date of Patent: May 29, 2012

(54) BOOT MOUNTING STRUCTURE FOR CONSTANT-SPEED UNIVERSAL JOINT, AND SILICONE BOOT FOR THE CONSTANT-SPEED UNIVERSAL JOINT

(75) Inventors: Yukihiro Watanabe, Iwata (JP); Keisuke Nishio, Iwata (JP)

(73) Assignee: NTN Corporation, Osaka (JP)

( * ) Notice: Subject to any disclaimer, the term of this patent is extended or adjusted under 35 U.S.C. 154(b) by 171 days.

(21) Appl. No.: 12/682,937

(22) PCT Filed: Oct. 15, 2008

(86) PCT No.: PCT/JP2008/068606
§ 371 (c)(1),
(2), (4) Date: Apr. 26, 2010

(87) PCT Pub. No.: WO2009/051118
PCT Pub. Date: Apr. 23, 2009

(65) Prior Publication Data
US 2010/0219590 A1    Sep. 2, 2010

(30) Foreign Application Priority Data
Oct. 17, 2007    (JP) .................................. 2007-269825

(51) Int. Cl.
*F16D 3/84* (2006.01)
(52) U.S. Cl. .......................... 464/175; 464/905; 464/906
(58) Field of Classification Search .................. 464/175, 464/173, 174, 905, 906; 403/50, 51; 277/634–636; 74/18–18.2; 24/20 CW, 20 R, 20 W
See application file for complete search history.

(56) References Cited

U.S. PATENT DOCUMENTS 3,688,523 A * 9/1972 Lutz Schafer et al. ........ 464/175
4,312,101 A * 1/1982 Oetiker .......................... 24/20 R
6,926,612 B2 * 8/2005 Wang et al. .................... 464/175
(Continued)

FOREIGN PATENT DOCUMENTS
JP    3-22576    5/1991
(Continued)

OTHER PUBLICATIONS

International Preliminary Report on Patentability and Written Opinion of the International Searching Authority mailed May 20, 2010 in International (PCT) Application No. PCT/JP2008/068606.

(Continued)

*Primary Examiner* — Gregory Binda
*Assistant Examiner* — Josh Skroupa
(74) *Attorney, Agent, or Firm* — Wenderoth, Lind & Ponack, L.L.P.

(57) ABSTRACT

A boot-mounting structure for a constant velocity universal joint has a configuration which can prevent a crack caused by interference with a boot band while maintaining a stable sealing property. The boot band (69) is fitted into a fitting groove of a silicone boot (65), and is decreased in diameter while being attached into the fitting groove, to thereby fix the silicone boot (65). The boot band (69) is formed into an annular body not provided with a folded-back portion. There is provided a no-interference structure means (S) for preventing interference caused, when the boot band is decreased in diameter, between an axial outer-peripheral-edge portion (69a or 69b) of the band (69) and a bottom end portion (82a or 82b) of the fitting groove (75) corresponding thereto.

14 Claims, 6 Drawing Sheets

U.S. PATENT DOCUMENTS

2005/0138778 A1 * 6/2005 Oetiker et al. ............ 24/20 R
2009/0017923 A1 1/2009 Okubo

FOREIGN PATENT DOCUMENTS

| JP | 05-180350 | | 7/1993 |
| JP | 09-196187 | | 7/1997 |
| JP | 09196187 | * | 7/1997 |
| JP | 10-299789 | | 11/1998 |
| JP | 2005-9641 | | 1/2005 |
| JP | 2005-121122 | | 5/2005 |
| JP | 2005121122 | * | 5/2005 |
| JP | 1 890 047 | | 2/2008 |
| WO | 2004/113753 | | 12/2004 |
| WO | 2006/123476 | | 11/2006 |

OTHER PUBLICATIONS

Supplementary European Search Report issued Nov. 3, 2011 in corresponding European Patent Application No. 08840269.8.

International Search Report issued Jan. 27, 2009 in International (PCT) Application No. PCT/JP2008/068606.

* cited by examiner

BOOT MOUNTING STRUCTURE FOR CONSTANT-SPEED UNIVERSAL JOINT, AND SILICONE BOOT FOR THE CONSTANT-SPEED UNIVERSAL JOINT

TECHNICAL FIELD

The present invention relates to a boot mounting structure for a constant velocity universal joint and a silicone boot for a constant velocity universal joint.

BACKGROUND ART

For the purpose of preventing intrusion of foreign matters such as dust into the joint and leakage of grease sealed in the joint, a bellows-like boot is attached to a constant velocity universal joint used for power transmission in automobiles and various industrial machines. The following are known as a material for the boot for a constant velocity universal joint: a silicone material, a chloroprene (CR) material, an ethylene-acrylic rubber (VAMAC) material, a chlorinated polyethylene (CM) material, or the like.

The constant velocity universal joint includes a plunging type constant velocity universal joint and a fixed type constant velocity universal joint. The plunging type constant velocity universal allows displacement in an axial direction and displacement of an operating angle, and the fixed type constant velocity universal joint allows only the displacement of the operating angle. For example, as illustrated in FIG. 6, a tripod type constant velocity universal joint serving as the plunging type constant velocity universal joint includes, as main components, an outer ring 1 serving as an outer joint member, a tripod member 2 serving as an inner joint member, and rollers 3 serving as torque transmitting members.

The outer joint member 1 includes a mouth portion 5 and a stem portion (not shown). The mouth portion 5 is formed into a cup shape opening to the side opposite to the stem portion, and has an inner surface in which track grooves 6 are arranged and formed along its circumferential direction at 120° pitches.

The tripod member 2 is constituted by a boss 8 and leg shafts 9. In the boss 8, there is formed a spline or a serration hole 61 which is coupled with a shaft 10 so as to transmit torque. The leg shafts 9 protrude from three equiangular positions of the boss 8 in a radial direction. The leg shafts 9 of the tripod member 2 support the rollers 3, respectively.

A boot 15 has a larger-diameter portion 16 to be fixed to the outer ring 1, a smaller-diameter portion 17 to be fixed to the shaft 10 coupled to the tripod member 2, and a bellows portion 18 provided between the larger-diameter portion 16 and the smaller-diameter portion 17. Further, each of the larger-diameter portion 16 and the smaller-diameter portion 17 is fixed by a boot band 20 attached therealong (see Patent Literature 1). Note that the bellows portion 18 is constituted by valley portions 18b and peak portions 18a formed alternately therein.

At the end portion on the opening side of the outer surface of the outer ring 1, a boot-fitting recessed portion 21 is provided, and the radially-inner portion of the larger-diameter portion 16 fits in the boot-fitting recessed portion 21. In this state, the boot band 20 is fitted in a band-fitting groove 22 formed along the radially-outer surface of the larger-diameter portion 16 so as to be attached thereon. As a result, the larger-diameter portion 16 of the boot 15 is fixed onto the outer ring 1.

Further, the shaft 10 is provided with, at a position protruding from the tripod member 2 by a predetermined amount, a boot-fitting portion 24 having a boot-fitting groove 23 formed along the circumferential direction, and the smaller-diameter portion 17 is externally fitted onto the boot-fitting portion 24. Then, the boot band 20 is fitted into a fitting groove 25 formed along the outer peripheral surface of the smaller-diameter portion 17 of the boot 15, to thereby fix the smaller diameter portion 17 to the shaft 10.

As the boot band, a so-called one-touch band and a low profile band are exemplified.

The boot band 20 called one-touch band is, as illustrated in FIG. 7, a band member 30 formed of a band-like metal material, which is curved like a ring and whose both ends are superimposed on one another so as to be engaged with each other. A lever member 32 is adhered to one of superimposed portions 31 of the band member 30.

When the smaller-diameter portion 17 of the boot 15 is mounted onto the shaft 10 with use of the boot band 20, the ring-like band member 30 is first loosely fitted onto the fitting groove 25 of the smaller-diameter portion 17 of the boot 15, and then the lever member 32 is folded back in this state using leverage. As a result, as illustrated in FIG. 8, the band member 30 fitted into the fitting groove 25 of the smaller diameter portion 17 of the boot 15 is decreased in diameter, to thereby clamp the smaller-diameter portion 17 of the boot 15. Note that the end portion of the lever member 32 is engaged by a stopper 33 (see FIG. 7) arranged in the vicinity of the superimposed portion 31.

The low profile band is formed of an annular body. The low profile band is fitted into the fitting groove 25 or the like formed along the outer peripheral surface of the smaller-diameter portion 17, and then decreased in diameter so that the smaller-diameter portion 17 is clamped.

CITATION LIST

Patent Literature 1: JP 10-299789 A

SUMMARY OF INVENTION

Technical Problem

In accordance with performance improvement and space reduction of vehicles in recent years, the operating environment for the constant velocity joint is becoming severe and performances required therefore are becoming high. For a boot for the constant velocity universal joint particularly used under the condition of high temperature, a silicone material or a chlorinated polyethylene (CM) material may be adopted for the purpose of improving heat resistance. Further, as an effective material capable of enduring both of a high temperature atmosphere of over 140° C. and a low temperature atmosphere of under −40° C., the silicone material is known.

However, due to a material characteristic of the silicone material, once a crack is generated in the silicone material, the crack easily spreads. Therefore, when the silicone material is adopted for the boot for the constant velocity universal joint, it is necessary to make a design by which cracking is more reliably prevented compared with other materials such as the CR material.

However, when the band as illustrated in FIG. 7 is used, there is a risk of cracking. This is because a folded-back portion of the band is provided as described above, and the boot (smaller-diameter portion 17 in this case) is nipped by the folded-back portion.

Further, the boot band has a flat rectangular cross-section, and has, as illustrated in FIG. 8, edge portions 20a and 20b.

Therefore, there is a risk that cracks are generated in portions interfering with the edge portions 20a and 20b.

In view of the above-mentioned problems, the present invention provides a boot-mounting structure for a constant velocity universal joint and a silicone boot for a constant velocity universal joint, which can prevent a crack caused by interference with the band while maintaining a stable sealing property.

Solution to Problem

According to the present invention, there is provided a boot-mounting structure for a constant velocity universal joint, including: a boot band, which is fitted into a fitting groove of a silicone boot, and is decreased in diameter while being attached into the fitting groove, to thereby fix the silicone boot, in which the boot band is formed into an annular body not provided with a folded-back portion, and in which a no-interference structure means for preventing interference caused, when the boot band is decreased in diameter, between an axial outer-peripheral-edge portion of the band and a bottom portion of the fitting groove corresponding thereto.

According to the boot-mounting structure for a constant velocity universal joint of the present invention, by the no-interference structure means, it is possible to avoid interference between the axial outer-peripheral-edge portion of the band and the bottom portion of the fitting groove corresponding thereto. In addition, the folded-back portion is not provided, unlike the above-mentioned one-touch band.

The no-interference structure means can be constructed by curving the axial outer-peripheral-edge portion of the band to a radially-outer side or by bending the axial outer-peripheral-edge portion of the band to the radially-outer side. By such curving or bending, it is possible to form a gap between the axial outer-peripheral-edge portion and the bottom portion of the fitting groove, to thereby avoid interference therebetween.

Further, as the no-interference structure means, it is also possible to form a circumferential groove in a bottom end portion of the fitting groove. Also in this case, it is possible to form a gap between the bottom end portion of the fitting groove and the axial outer-peripheral-edge portion of the band, to thereby avoid interference therebetween.

According to the present invention, there is provided a silicone boot for a constant velocity universal joint, including: a larger-diameter portion to be mounted to an outer joint member of the constant velocity universal joint; a smaller-diameter portion to be mounted to a shaft coupled to an inner joint member of the constant velocity universal joint; and a bellows portion, which is arranged between the larger-diameter portion and the smaller-diameter portion and includes a peak portion and a valley portion formed alternately with each other, in which the smaller-diameter portion is fixed to the shaft through the boot-mounting structure.

According to the present invention, there is provided a silicone boot for a constant velocity universal joint, including: a larger-diameter portion to be mounted to an outer joint member of the constant velocity universal joint; a smaller-diameter portion to be mounted to a shaft connected to an inner joint member of the constant velocity universal joint; and a bellows portion, which is arranged between the larger-diameter portion and the smaller-diameter portion and includes a peak portion and a valley portion formed alternately with each other, in which the larger-diameter portion is fixed to the outer joint member of the constant velocity universal joint through the boot-mounting structure.

The constant velocity universal joint may include a plunging type constant velocity universal joint which allows displacement in an axial direction and displacement of an operating angle or may include a fixed type constant velocity universal joint which allows only displacement of the operating angle.

Advantageous Effects of Invention

According to the present invention, it is possible to avoid interference between the axial outer-peripheral-edge portion of the band and the bottom portion of the fitting groove corresponding thereto. Therefore, it is possible to prevent cracks of the boot caused by the axial outer-peripheral-edge portion of the band. In addition, the folded-back portion is not provided, and hence it is possible to prevent the crack of the boot caused by such folded-back portion. Therefore, as the boot material, silicone can be used, and the boot can be used stably under the high temperature atmosphere and the low temperature atmosphere. In addition, because the cracks of the boot can be prevented, it is possible to exert a stable sealing function for a long period of time.

By curving or bending the axial outer-peripheral-edge portion of the band to the radially-outer side, it is possible to easily and stably constitute the no-interference structure means. In this case, the existing boot can be used without changing the shape, size, and the like of the fitting groove, and hence the cost can be reduced.

By forming the circumferential groove in the bottom end portion of the fitting groove, it is possible to constitute the no-interference structure means easily and stably. In this case, the existing band can be used without changing its shape, size, and the like, and hence the cost can be reduced.

When the larger-diameter portion of the boot is fixed to the outer joint member of the constant velocity universal joint with use of the boot-mounting structure for the constant velocity universal joint, a stable sealing function can be exerted in the larger-diameter portion of the boot for a long period of time. Further, when the smaller-diameter portion of the boot is fixed to the shaft with use of the boot-mounting structure for the constant velocity universal joint, the stable sealing function can be exerted in the smaller-diameter portion of the boot for a long period of time.

As the constant velocity universal joint, it is possible to use both the plunging type constant velocity universal joint and the fixed type constant velocity universal joint. The boot-mounting structure can be applied widely to various types of constant velocity universal joints.

DESCRIPTION OF EMBODIMENTS

In the following, description is made of an embodiment of the present invention with reference to FIGS. 1 to 6.

Figure 1:
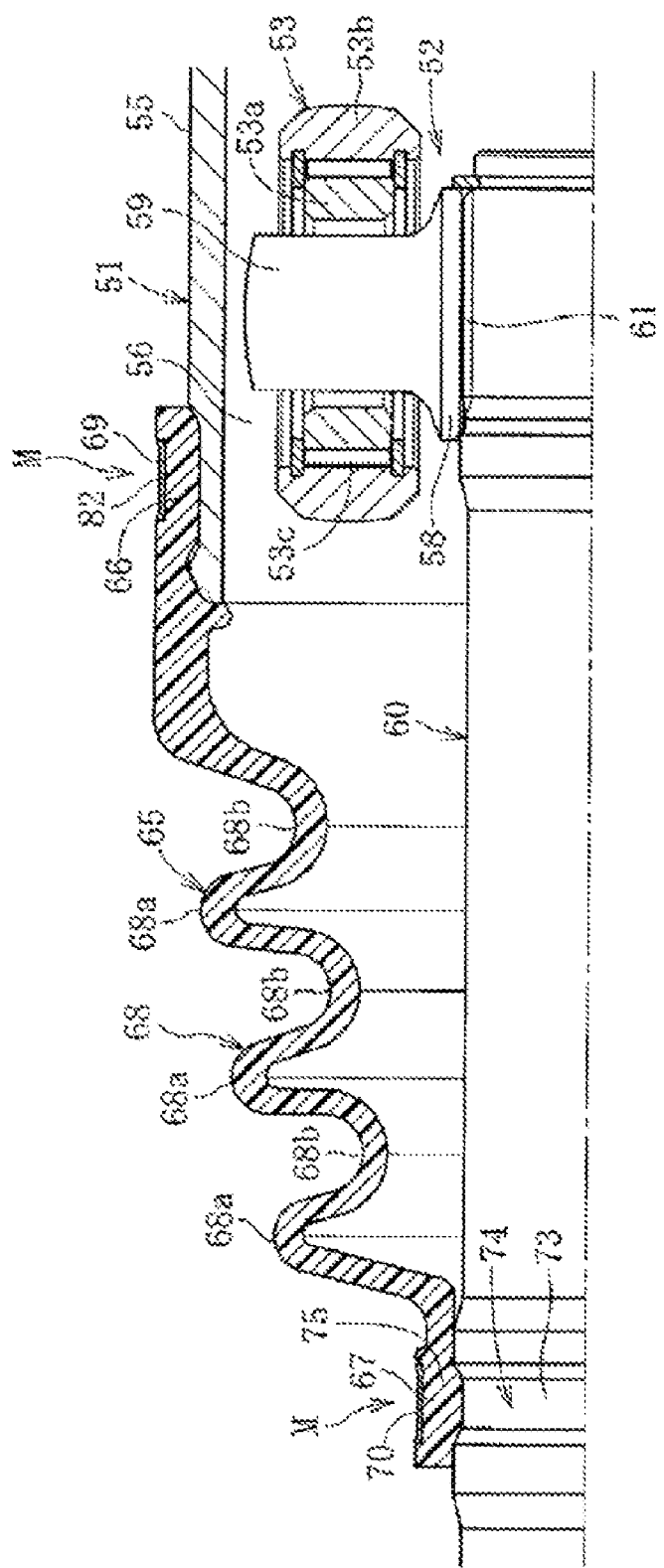
FIG. 1 is a sectional view of a constant velocity universal joint in which a silicone boot according to an embodiment of the present invention is used.

As illustrated in FIG. 1, a tripod type constant velocity universal joint which is a plunging type constant velocity universal joint includes the following as main components: an outer ring 51 serving as an outer joint member, a tripod member 52 as an inner joint member, and rollers 53 serving as a torque transmitting member.

The outer ring 51 includes a mouth portion 55 and a stem portion (not shown). The mouth portion 55 is formed into a cup shape opening to the side opposite to the stem portion, and has an inner surface in which track grooves 56 are arranged and formed along its circumferential direction at 120° pitches.

The tripod member 52 is constituted by a boss 58 and leg shafts 59. In the boss 58, there is formed a spline or a serration hole 61 which is coupled with a shaft 60 so as to transmit torque. The leg shafts 59 protrude from three equiangular positions of the boss 58 in a radial direction. The leg shafts 59 of the tripod member 52 support the rollers 53, respectively.

The rollers 53 used in this case are rollers of a so-called double-roller type, and each of the rollers 53 includes an inner roller 53a, an outer roller 53b, and needle rollers 53c interposed between the inner roller 53a and the outer roller 53b. Note that the rollers 53 may be rollers of a single-roller type, which is not provided with two rollers including the inner roller and the outer roller.

The opening portion of the outer ring 51 is closed by a boot 65. The boot 65 has a larger-diameter portion 66 to be fixed to the outer ring 51, a smaller-diameter portion 67 to be fixed to the shaft 60 coupled to the tripod member 52, and a bellows portion 68 provided between the larger-diameter portion 66 and the smaller-diameter portion 67. Further, the larger-diameter portion 66 and the smaller-diameter portion 67 are fixed by boot bands 69 and 70 attached therealong, respectively. Note that the bellows portion 68 is constituted by valley portions 68b and peak portions 68a formed alternately therein.

The boot 65 is made of silicone. The silicone is a generic name of a high molecular weight organic compound (polymer) having siloxane bonds in the backbone. The silicone is colorless and odorless, and has water repellency. Differences in degree of polymerization and the like provide products of different forms such as grease, wax, oil, rubber (elastomer), and gel. All of those products are nonconductors and have oil resistance, oxidation resistance, and heat resistance which are higher than those of corresponding products of a carbon backbone polymer.

The larger-diameter portion 66 and the boot band 69 are fixed to each other through a boot-mounting structure M for a constant velocity universal joint according to the present invention, and the smaller-diameter portion 67 and the boot band 70 are fixed to each other through a boot-mounting structure M for the constant velocity universal joint according to the present invention.

Figure 2:
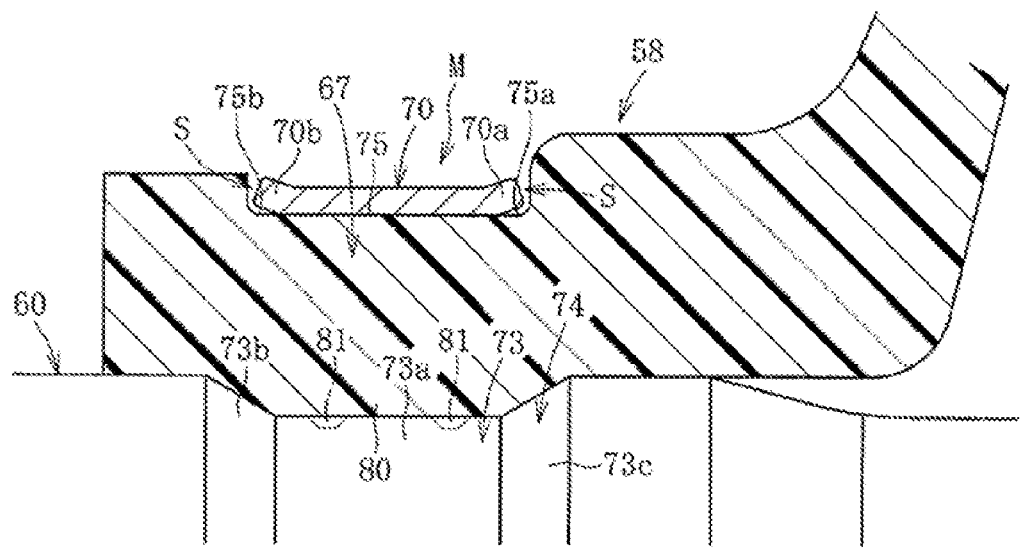
FIG. 2 is an enlarged sectional view of a smaller-diameter portion of the silicone boot for a constant velocity universal joint according to the present invention.

In the boot-mounting structure M for the constant velocity universal joint on the smaller-diameter portion 67 side, as illustrated in FIG. 2, the band 70 is formed of annular metal and has a flat rectangular cross-sectional shape. Further, axial outer-peripheral-edge portions 70a and 70b are bent to the radially-outer side. As a result, it is possible to constitute no-interference structure means S for avoiding interference between the axial outer-peripheral-edge portions 70a and 70b of the band 70 and bottom end portions 75a and 75b corresponding thereto of a fitting groove 75, respectively.

The shaft 60 is provided with, at a position protruding from the tripod member 2 by a predetermined amount, a boot-fitting portion 74 having a boot-fitting groove 73 formed along the circumferential direction, and the smaller-diameter portion 67 is externally fitted onto the boot-fitting portion 74. In this case, the smaller-diameter portion 67 is provided with a swelled portion 80, which is formed along the inner peripheral surface thereof and is fitted into the boot-fitting groove 73 of the boot-fitting portion 74, and with the fitting groove 75, which is formed along the outer peripheral surface thereof and into which the band 70 is fitted. Note that the boot-fitting groove 73 includes a bottom surface 73a and inclined side surfaces 73b and 73c to exhibit a trapezoidal shape in cross section. Therefore, in the state in which the smaller-diameter portion 67 is fitted to the boot-fitting portion 74 and the band 70 is attached thereon as described later, the swelled portion 80 exhibits a shape corresponding to the shape of the boot-fitting portion 74. Note that, in the inner peripheral surface of the swelled portion 80 of the smaller-diameter portion 67, a pair of small projections 81 and 81 are formed along the circumferential direction. The small projections 81 and 81 are crushed due to clamping by the band 70. Therefore, sealing property can be improved.

Figure 3:
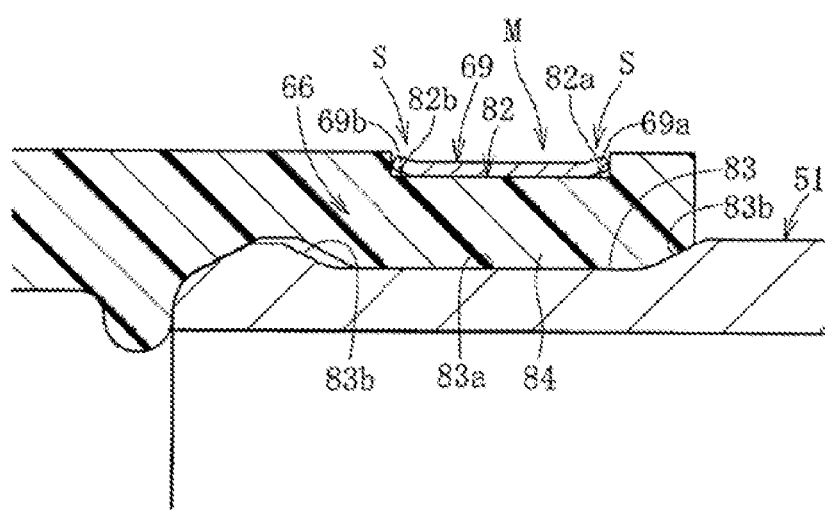
FIG. 3 is an enlarged sectional view of a smaller-diameter portion of the silicone boot for a constant velocity universal joint according to the present invention.

Further, also in the boot-mounting structure M for the constant velocity universal joint on the larger-diameter portion 66 side, as illustrated in FIG. 3, the boot band 69 is formed of an annular body which is not provided with a folded-back portion, and has a flat rectangular cross-sectional shape. Further, axial outer-peripheral-edge portions 69a and 69b are bent to the radially-outer side. As a result, it is possible to constitute the no-interference structure means S for avoiding interference between the axial outer-peripheral-edge portions 69a and 69b of the band 69 and bottom end portions 82a and 82b corresponding thereto of a fitting groove 82, respectively.

A boot-fitting recessed portion 83 is formed on the opening side of the outer peripheral surface of the outer ring 51. Further, the larger-diameter portion 66 is provided with a swelled portion 84, which is formed along the inner peripheral surface thereof and is fitted into the boot-fitting groove 83, and with the fitting groove 82, which is formed along the outer peripheral surface thereof and into which the band 69 is fitted. Note that the boot-fitting recessed portion 83 includes a bottom surface 83a and inclined side surfaces 83b and 83b to exhibit a trapezoidal shape in cross section. Therefore, in the state in which the larger-diameter portion 66 is fitted to the boot-fitting recessed portion 83 and the band 69 is attached thereon as described later, the swelled portion 84 exhibits a shape corresponding to the shape of the boot-fitting recessed portion 83.

Next, the attachment method for the boot 65 is described. First, description is made of the attachment method for the smaller-diameter portion 67. The smaller-diameter portion 67 is externally fitted onto the boot-fitting portion 74 of the shaft

60. After that, the boot band 70 is externally fitted onto the smaller-diameter portion 67. In this state, the boot band 70 is decreased in diameter. In this manner, the boot band 70 is fitted onto the boot-fitting portion 74 and the smaller-diameter portion 67 is clamped. As a result, the smaller-diameter portion 67 is fixed to the shaft 60.

Next, description is made of the attachment method for the larger-diameter portion 66. The larger-diameter portion 66 is externally fitted onto the boot-fitting recessed portion 83 of the outer ring 51. After that, the boot band 69 is externally fitted onto the larger-diameter portion 66. In this state, the boot band 69 is decreased in diameter. In this manner, the boot band 69 is fitted into the fitting groove 82 and the larger-diameter portion 66 is clamped. As a result, the larger-diameter portion 66 is fixed to the outer ring 51.

According to the present invention, it is possible to avoid interference between the axial outer-peripheral-edge portions 69a and 69b (70a and 70b) of the band 69 (70) and the bottom portions of the fitting groove 82 (75) corresponding thereto, that is, the bottom end portions 82a and 82b (75a and 75b), respectively. Therefore, it is possible to prevent cracks of the boot caused by the axial outer-peripheral-edge portions 69a and 69b (70a and 70b) of the band 69 (70). In addition, the folded-back portion is not provided, and hence it is possible to prevent the crack of the boot caused by such folded-back portion. Therefore, as the boot material, silicone can be used, and the boot can be used stably under the high temperature atmosphere and the low temperature atmosphere. In addition, because the cracks of the boot 65 can be prevented, it is possible to exert a stable sealing function for a long period of time.

Incidentally, in the above-mentioned embodiment, in order to constitute the no-interference structure means S, the axial outer-peripheral-edge portions 69a and 69b (70a and 70b) of the band 69 (70) are bent, that is, folded, to the radially-outer side. However, the axial outer-peripheral-edge portions 69a and 69b (70a and 70b) may be curved like an arc so as not to form folded portions.

Figure 4A:
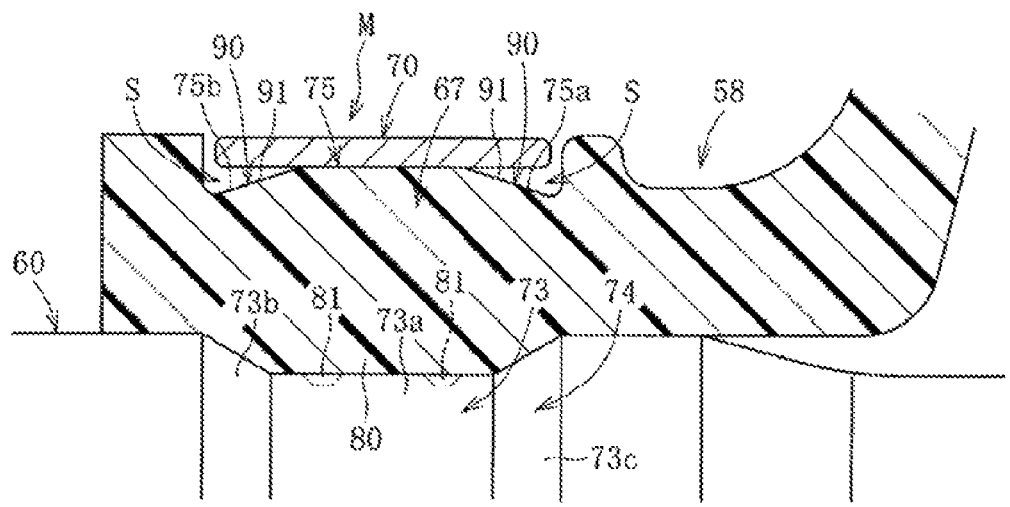
FIG. 4A is a sectional view illustrating a first modification of a fitting groove in a case of using a band which is not provided with folded portions at axial end portions thereof.

Between FIG. 4 and FIG. 5, the cross-sectional shape of the fitting groove 75 of the smaller-diameter portion 67 are different. In the fitting groove 75 illustrated in FIG. 4, circumferential grooves 90 and 90 are formed in the bottom end portions so as to constitute the no-interference structure means S. The circumferential grooves 90 in this case are constituted by recessed grooves having a triangular cross-section in which bottom surfaces 91 are formed as inclined surfaces inclined from the axially-outer side toward the axial center to the radially-outer side. Therefore, in FIG. 4A, it is possible to use an existing band 70 in which the axial outer-peripheral-edge portions 70a and 70b are not bent or curved to the radially-outer side.

Also by the no-interference structure means S illustrated in FIG. 4A, it is possible to avoid interference between the axial outer-peripheral-edge portions 70a and 70b of the band 70 and the bottom end portions 75a and 75b of the fitting groove 75 corresponding thereto. Therefore, the same operational effects as those of the no-interference structure means S illustrated in FIG. 1 can be obtained.

Figure 4B:
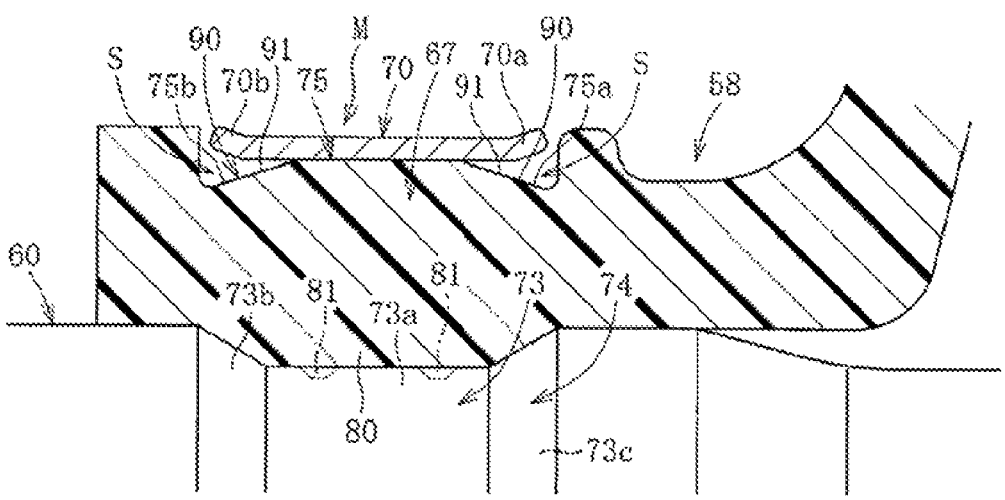
FIG. 4B is a sectional view illustrating the first modification of the fitting groove in a case of using a band which is provided with folded portions at axial end portions thereof.

Further, even in the fitting groove 75 of the shape illustrated in FIG. 4A, it is possible to use, as illustrated in FIG. 4B, as the band 70, one in which the axial outer-peripheral-edge portions 70a and 70b are bent or curved. In this case, it is possible to more reliably avoid interference between the axial outer-peripheral-edge portions 70a and 70b of the band 70 and the bottom end portions 75a and 75b of the fitting groove 75 corresponding thereto.

Note that, by adopting the shape illustrated in FIG. 4B, stress is decreased by about 60% compared with the prior art in which the axial outer-peripheral-edge portions 69a and 69b (70a and 70b) of the band 69 (70) interfere with the bottom portion of the fitting groove 82 (75).

Figure 5A:
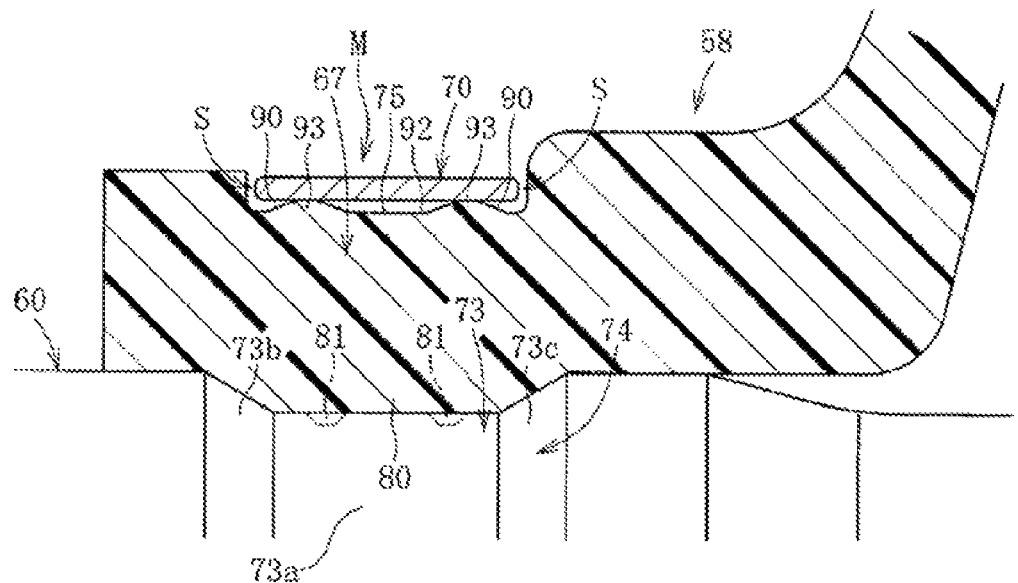
FIG. 5A is a sectional view illustrating a second modification of a fitting groove in the case of using the band which is not provided with folded portions at the axial end portions thereof.
Figure 5B:
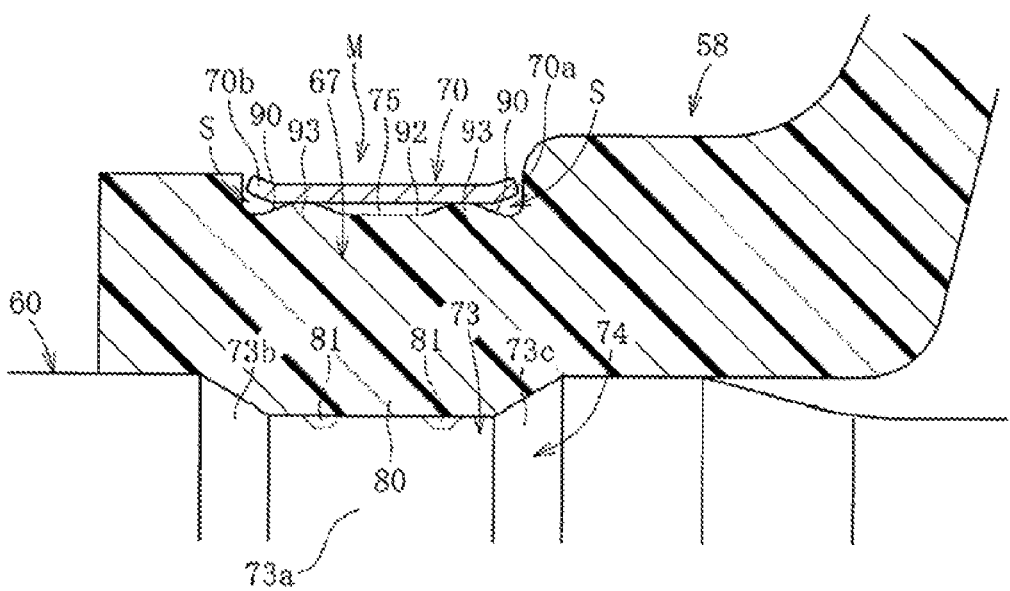
FIG. 5B is a sectional view illustrating the second modification of the fitting groove in the case of using the band which is provided with the folded portions at axial end portions thereof.
Figure 6:
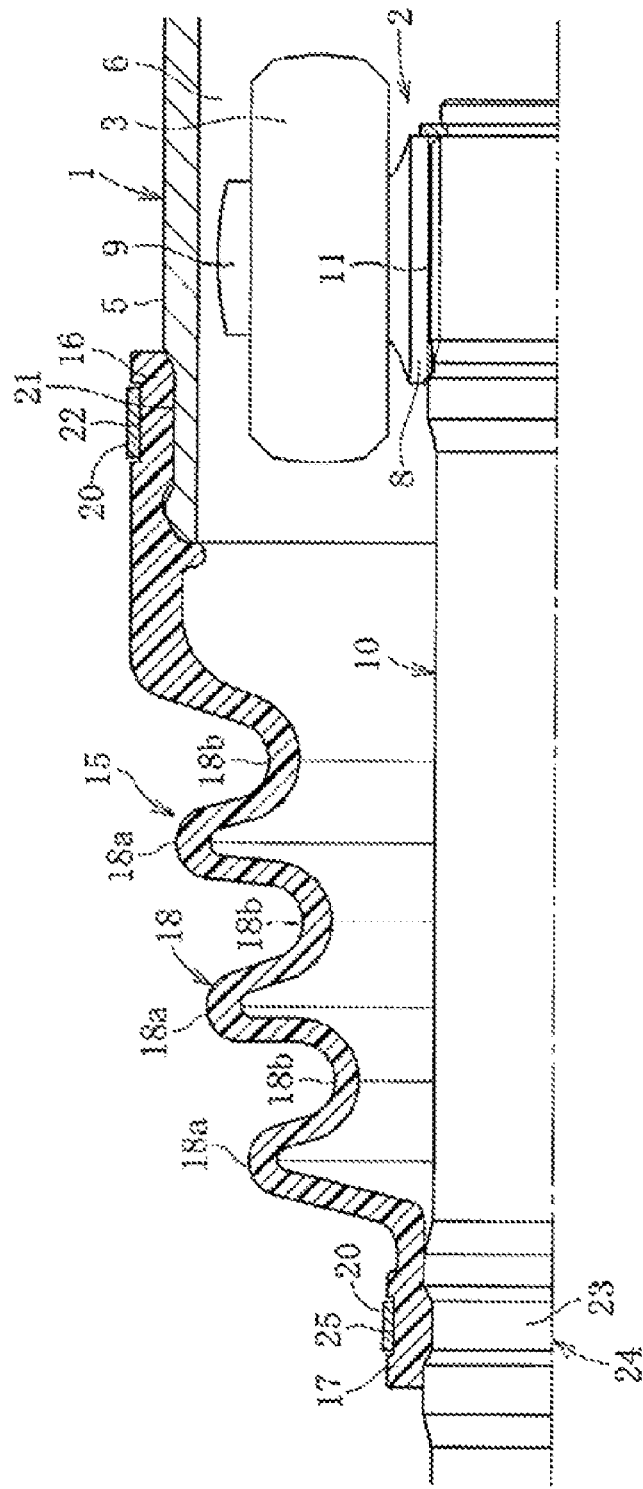
FIG. 6 is a sectional view in which a conventional silicone boot for a constant velocity universal joint is used.
Figure 7:
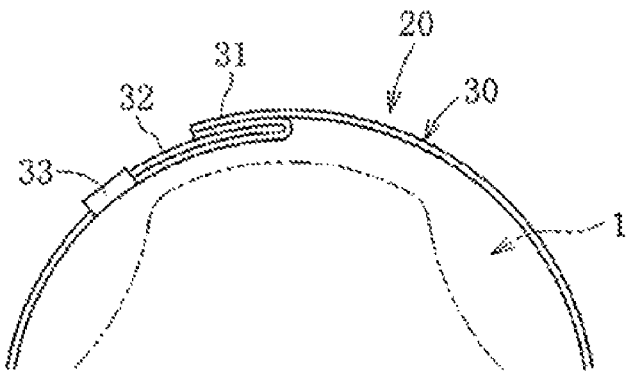
FIG. 7 is a simplified view illustrating a conventional boot band in an enlarged manner.
Figure 8:
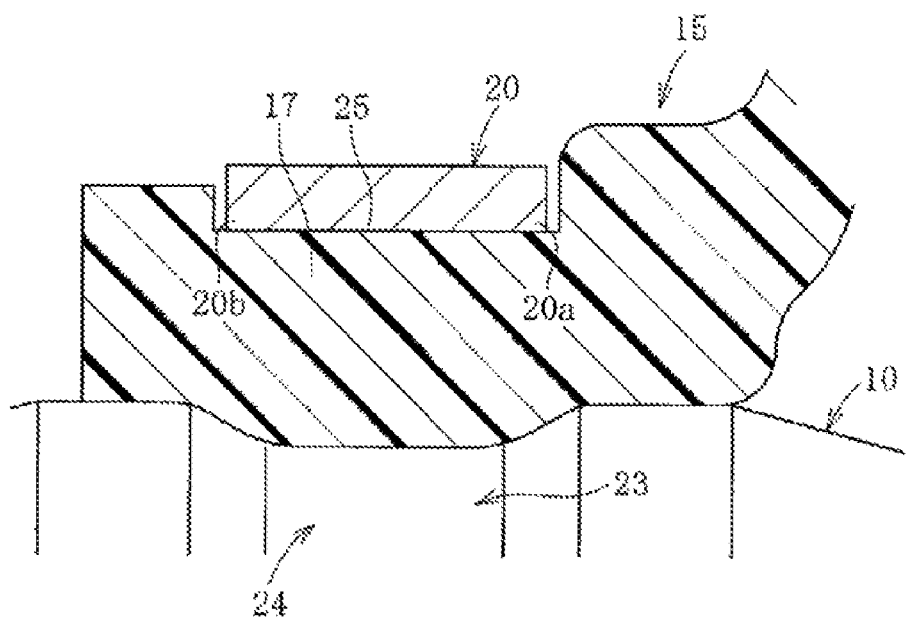
FIG. 8 is a simplified schematic view illustrating a main portion of the conventional boot band in an enlarged manner.

In the fitting groove 75 illustrated in FIG. 5, a central recessed groove 92 is formed between the circumferential grooves 90 and 90, and a pair of protruding portions 93 and 93 are provided on the bottom surface of the fitting groove 75. Therefore, in FIG. 5A, similarly to FIG. 4A, it is possible to use the existing band 70 in which the axial outer-peripheral-edge portions 70a and 70b are not bent or curved to the radially-outer side. As illustrated in FIG. 5B, it is possible to use, as the band 70, one in which the axial outer-peripheral-edge portions 70a and 70b are not bent or curved to the radially-outer side.

Also by the no-interference structure means S illustrated in FIG. 5, it is possible to avoid interference between the axial outer-peripheral-edge portions 70a and 70b of the band 70 and the bottom end portions of the fitting groove corresponding thereto. Therefore, the same operational effects as those of the no-interference structure means S illustrated in FIG. 1 can be obtained. In particular, as illustrated in FIG. 5B, it is preferred to use the band 70 in which the axial outer-peripheral-edge portions 70a and 70b are bent or curved to the radially-outer side.

There may be given constant velocity universal joints to which the boot of the present invention is applicable, such as one capable of forming high operating angles (for example, a ball-fixed constant velocity universal joint such as a Rzeppa joint and a Birfield joint), and one provided with a mechanism for plunging in an axial direction of the outer joint member while being incapable of forming sufficiently high operating angles (for example, a plunging type constant velocity universal joint such as a double offset joint, a tripod joint, and a cross-groove joint). As described above, the boot of the present invention is applicable to those various constant velocity universal joints. With this, it is possible to constitute a constant velocity universal joint which is excellent in durability and to which a silicone boot for a constant velocity universal joint is attached, the boot being excellent in cracking resistance.

It is particularly preferred that the boot of the present invention be applied to a plunging type constant velocity universal joint used on a side of a differential gear used for a drive shaft for an automobile. This is because the constant velocity universal joint is frequently exposed to high temperature atmosphere.

Hereinabove, the embodiment of the present invention is described. However, the present invention is not limited to the above-mentioned embodiment and various modifications may be made thereto. For example, when the axial outer-peripheral-edge portions 69a, 69b (70a, 70b) of the band 69 (70) are bent, the bending angle and the bending position thereof may be changed as long as they do not interfere with the bottom portion of the fitting groove 82 (75) and the clamping of the boot 65 can be stabilized. Further, when they are curved like an arc, the radius of curvature and the like may be changed as long as they do not interfere with the bottom portion of the fitting groove and the clamping of the boot can be stabilized.

Though FIG. 4 and FIG. 5 illustrate the boot-mounting structure for the constant velocity universal joint on the smaller-diameter portion 67 side, the fitting groove of the shape illustrated in FIG. 4 and FIG. 5 may be adopted on the larger-diameter portion 66 side. Further, the numbers of the peak portions 68a and the valley portions 68b formed in the bellows portions 68 are not limited to those in the above-mentioned embodiment, and the longitudinal dimension (axial length) may be variously changed depending on the constant velocity universal joint and the like for which the boot is used.

Note that, though the small projections 81 and 81 are formed on the swelled portion 80 of the smaller-diameter portion 67 in the above-mentioned embodiment, the number of the small projections 81 and 81 may be arbitrarily increased or decreased, or the small projections 81 may be omitted. In the case of providing the small projections 81, it is possible to provide, on the shaft 60 side, small grooves into which the small projections 81 are fitted. Further, it is also possible to provide the small projections 81 on the larger-diameter portion 66 side.

INDUSTRIAL APPLICABILITY

A ball-fixed constant velocity universal joint such as a Rzeppa joint and a Birfield joint, and a plunging type constant velocity universal joint such as a double offset joint, a tripod joint, and a cross-groove joint are applicable. With this, it is possible to constitute a constant velocity universal joint which is excellent in durability and to which a silicone boot for a constant velocity universal joint is attached, the boot being excellent in cracking resistance.

REFERENCE SIGNS LIST 60 shaft
65 boot
66 larger-diameter portion
67 smaller-diameter portion
68 bellows portion
69 boot band
69a, 69b axial outer-peripheral-edge portion
70 boot band
70a, 70b axial outer-peripheral-edge portion
75 fitting groove
82 fitting groove
82a, 82b bottom end portion
83 boot-fitting recessed portion
S non-interacting structure means

The invention claimed is:

1. A boot-mounting structure for a constant velocity universal joint, the boot-mounting structure comprising:
   a silicone boot having a fitting groove; and
   a boot band fitted into the fitting groove of the silicone boot, the boot band being decreased in diameter while being attached into the fitting groove, to thereby fix the silicone boot,
   wherein the boot band is formed into an annular body and does not have a folded-back portion,
   wherein a no-interference structure for preventing interference, caused when the boot band is decreased in diameter, between an axial outer-peripheral-edge portion of the boot band and a bottom end portion of the fitting groove corresponding thereto, and
   wherein the no-interference structure is constituted by at least one of the following:
   (i) axial outer-peripheral edge portions of the boot band being bent or curved to a radially-outer side thereof; and
   (ii) a circumferential groove being formed in the bottom end portions of the fitting groove.

2. The boot-mounting structure of claim 1, wherein the silicone boot comprises:
   a larger-diameter portion to be mounted to an outer joint member of the constant velocity universal joint;
   a smaller-diameter portion to be mounted to a shaft coupled to an inner joint member of the constant velocity universal joint; and
   a bellows portion which is arranged between the larger-diameter portion and the smaller-diameter portion and comprises a peak portion and a valley portion formed alternately with each other,
   wherein the smaller-diameter portion is configured to be fixed to the shaft through the boot-mounting structure.

3. The boot-mounting structure of claim 1, wherein the silicone boot comprises:
   a larger-diameter portion to be mounted to an outer joint member of the constant velocity universal joint;
   a smaller-diameter portion to be mounted to a shaft coupled to an inner joint member of the constant velocity universal joint; and
   a bellows portion which is arranged between the larger-diameter portion and the smaller-diameter portion and comprises a peak portion and a valley portion formed alternately with each other,
   wherein the larger-diameter portion is configured to be fixed to the outer joint member of the constant velocity universal joint through the boot-mounting structure.

4. A constant velocity universal joint comprising:
   the boot-mounting structure of claim 1;
   an outer joint member;
   an inner joint member; and
   a shaft coupled to the inner joint member;
   wherein the silicone boot comprises:
   (i) a larger-diameter portion mounted to the outer joint member;
   (ii) a smaller-diameter portion mounted to a shaft coupled to an inner joint member; and
   (iii) a bellows portion which is arranged between the larger-diameter portion and the smaller-diameter portion and comprises a peak portion and a valley portion formed alternately with each other,
   wherein the smaller-diameter portion is fixed to the shaft through the boot-mounting structure, and
   wherein the constant velocity universal joint is a plunging constant velocity universal joint which allows displacement in an axial direction and displacement of an operating angle.

5. A constant velocity universal joint comprising:
   the boot-mounting structure of claim 1;
   an outer joint member;
   an inner joint member; and
   a shaft coupled to the inner joint member;
   wherein the silicone boot comprises:
   (i) a larger-diameter portion mounted to the outer joint member;
   (ii) a smaller-diameter portion mounted to a shaft coupled to an inner joint member; and
   (iii) a bellows portion which is arranged between the larger-diameter portion and the smaller-diameter portion and comprises a peak portion and a valley portion formed alternately with each other,
   wherein the smaller-diameter portion is fixed to the shaft through the boot-mounting structure, and
   wherein the constant velocity universal joint comprises a fixed type constant velocity universal joint which allows only displacement of an operating angle.

6. A constant velocity universal joint comprising:
   the boot-mounting structure of claim 1;
   an outer joint member;

an inner joint member; and
a shaft coupled to the inner joint member;
wherein the silicone boot comprises:
(i) a larger-diameter portion mounted to the outer joint member;
(ii) a smaller-diameter portion mounted to a shaft coupled to an inner joint member; and
(iii) a bellows portion which is arranged between the larger-diameter portion and the smaller-diameter portion and comprises a peak portion and a valley portion formed alternately with each other,
wherein the larger-diameter portion is fixed to the outer joint member through the boot-mounting structure, and
wherein the constant velocity universal joint is a plunging constant velocity universal joint which allows displacement in an axial direction and displacement of an operating angle.

7. A constant velocity universal joint comprising:
the boot-mounting structure of claim 1;
an outer joint member;
an inner joint member; and
a shaft coupled to the inner joint member;
wherein the silicone boot comprises:
(i) a larger-diameter portion mounted to the outer joint member;
(ii) a smaller-diameter portion mounted to a shaft coupled to an inner joint member; and
(iii) a bellows portion which is arranged between the larger-diameter portion and the smaller-diameter portion and comprises a peak portion and a valley portion formed alternately with each other,
wherein the larger-diameter portion is fixed to the outer joint member through the boot-mounting structure, and
wherein the constant velocity universal joint comprises a fixed type constant velocity universal joint which allows only displacement of an operating angle.

8. A constant velocity universal joint comprising:
the boot-mounting structure of claim 1;
an outer joint member;
an inner joint member; and
a shaft coupled to the inner joint member;
wherein the silicone boot comprises:
(i) a larger-diameter portion mounted to the outer joint member;
(ii) a smaller-diameter portion mounted to a shaft coupled to an inner joint member; and
(iii) a bellows portion which is arranged between the larger-diameter portion and the smaller-diameter portion and comprises a peak portion and a valley portion formed alternately with each other,
wherein the smaller-diameter portion is fixed to the shaft through the boot-mounting structure, and
wherein the larger-diameter portion is fixed to the outer joint member through the boot-mounting structure.

9. The boot-mounting structure of claim 1, wherein the no-interference structure is constituted by bending the axial outer-peripheral-edge portion of the boot band to a radially-outer side thereof.

10. A constant velocity universal joint comprising:
the boot-mounting structure of claim 9;
an outer joint member;
an inner joint member; and
a shaft coupled to the inner joint member;
wherein the silicone boot comprises:
(i) a larger-diameter portion mounted to the outer joint member;
(ii) a smaller-diameter portion mounted to a shaft coupled to an inner joint member; and
(iii) a bellows portion which is arranged between the larger-diameter portion and the smaller-diameter portion and comprises a peak portion and a valley portion formed alternately with each other,
wherein the smaller-diameter portion is fixed to the shaft through the boot-mounting structure, and
wherein the larger-diameter portion is fixed to the outer joint member through the boot-mounting structure.

11. The boot-mounting structure of claim 1, wherein the no-interference structure is constituted by curving the axial outer-peripheral-edge portion of the band to a radially-outer side thereof.

12. A constant velocity universal joint comprising:
the boot-mounting structure of claim 11;
an outer joint member;
an inner joint member; and
a shaft coupled to the inner joint member;
wherein the silicone boot comprises:
(i) a larger-diameter portion mounted to the outer joint member;
(ii) a smaller-diameter portion mounted to a shaft coupled to an inner joint member; and
(iii) a bellows portion which is arranged between the larger-diameter portion and the smaller-diameter portion and comprises a peak portion and a valley portion formed alternately with each other,
wherein the smaller-diameter portion is fixed to the shaft through the boot-mounting structure, and
wherein the larger-diameter portion is fixed to the outer joint member through the boot-mounting structure.

13. The boot-mounting structure of claim 1, wherein the no-interference structure is constituted by forming a circumferential groove in the bottom end portion of the fitting groove.

14. A constant velocity universal joint comprising:
the boot-mounting structure of claim 13;
an outer joint member;
an inner joint member; and
a shaft coupled to the inner joint member;
wherein the silicone boot comprises:
(i) a larger-diameter portion mounted to the outer joint member;
(ii) a smaller-diameter portion mounted to a shaft coupled to an inner joint member; and
(iii) a bellows portion which is arranged between the larger-diameter portion and the smaller-diameter portion and comprises a peak portion and a valley portion formed alternately with each other,
wherein the smaller-diameter portion is fixed to the shaft through the boot-mounting structure, and
wherein the larger-diameter portion is fixed to the outer joint member through the boot-mounting structure.

* * * * *